US012447585B2

(12) United States Patent
Hsieh

(10) Patent No.: US 12,447,585 B2
(45) Date of Patent: Oct. 21, 2025

(54) SOCKET

(71) Applicant: KABO Tool Company, Taichung (TW)

(72) Inventor: Chih-Ching Hsieh, Taichung (TW)

(73) Assignee: KABO Tool Company, Taichung (TW)

( * ) Notice: Subject to any disclaimer, the term of this patent is extended or adjusted under 35 U.S.C. 154(b) by 348 days.

(21) Appl. No.: 18/181,073

(22) Filed: Mar. 9, 2023

(65) Prior Publication Data

US 2023/0286115 A1 Sep. 14, 2023

(30) Foreign Application Priority Data

Mar. 10, 2022 (TW) .................................. 111108856

(51) Int. Cl.
*B25B 13/06* (2006.01)
*B25B 23/00* (2006.01)

(52) U.S. Cl.
CPC .......... *B25B 13/06* (2013.01); *B25B 23/0035* (2013.01)

(58) Field of Classification Search
CPC ....... B25B 13/06; B25B 13/065; B25B 13/08; B25B 23/0035; B25G 1/102; B25G 1/105
USPC ................................................. D8/17, 27, 29
See application file for complete search history.

(56) References Cited

U.S. PATENT DOCUMENTS 2,701,491 A * 2/1955 Ross ..................... B25B 23/108 81/3.4
4,583,694 A * 4/1986 Williams .............. B25B 13/065 239/289
4,836,059 A * 6/1989 Arnold ................ B29C 66/1222 81/177.1
4,947,713 A * 8/1990 Arnold .................... B25B 13/06 81/184
4,979,355 A * 12/1990 Ulevich ................ B25B 13/107 81/DIG. 11
5,009,133 A * 4/1991 Carey ..................... B25B 13/06 81/180.1
5,079,978 A * 1/1992 Kupfer .................... B25B 13/56 81/DIG. 5
6,029,547 A * 2/2000 Eggert .................... B25B 13/06 81/125
6,126,882 A * 10/2000 Iwinski ............. B29C 45/14467 264/261
D442,837 S * 5/2001 Porras .............................. D8/29
6,761,093 B2 * 7/2004 Chang ..................... B25B 13/06 81/DIG. 5
D497,295 S * 10/2004 McKnight ........................ D8/29
D510,847 S * 10/2005 McKnight ........................ D8/29
6,951,156 B2 * 10/2005 Garg ....................... B25B 13/06 81/121.1
7,082,864 B1 * 8/2006 Weber ..................... B25B 13/56 81/492

(Continued)

*Primary Examiner* — David B. Thomas
(74) *Attorney, Agent, or Firm* — Wang Law Firm, Inc.

(57) ABSTRACT

A socket includes a main body. The main body includes an output surface, an outer annular wall, and a resistance structure. The output surface is located at one end of the main body, surrounds an opening of the main body, and is perpendicular to a driving axis of the socket. The outer annular wall is connected with the output surface and includes an operating portion. The resistance structure is located on, and extends annularly along, the output surface. When an operator tries to remove the socket from a hand tool, the socket provides increased friction between the operator's hand and the output surface and therefore can be securely gripped.

16 Claims, 6 Drawing Sheets

(56) References Cited

U.S. PATENT DOCUMENTS 7,159,491 B1 * 1/2007 Chaconas ........... B25B 23/0035 81/177.85
D542,106 S * 5/2007 Alsobrook ....................... D8/29
7,284,464 B2 * 10/2007 Chaconas ............... B25B 13/06 81/58
D600,521 S * 9/2009 Butler .............................. D8/29
8,074,539 B2 * 12/2011 Lin ........................... G09F 3/00 81/DIG. 5
8,978,522 B2 * 3/2015 Hsieh ...................... B25B 13/08 81/124.4
9,021,924 B2 * 5/2015 Hsieh .................. B25B 23/0007 81/125.1
9,027,446 B1 * 5/2015 Simkin ................... B25B 13/06 81/124.2
9,522,457 B2 * 12/2016 Huang .................. B25B 23/105
D776,504 S * 1/2017 Lee .................................. D8/29
9,839,995 B2 * 12/2017 Kovach ................... B25B 13/48
10,675,739 B2 * 6/2020 Miley ..................... B25B 23/12
10,737,371 B2 * 8/2020 Watson ................. B25B 13/481
11,890,729 B2 * 2/2024 Hsiao .................. B25B 23/0035
2004/0194585 A1 * 10/2004 Clark ...................... B25B 13/06 81/124.2
2006/0266166 A1 * 11/2006 Weber ..................... B25B 13/06 81/184
2008/0066584 A1 * 3/2008 Vines ...................... B25B 13/06 81/124.2
2008/0121073 A1 * 5/2008 Williams ................ B25B 13/02 81/121.1
2009/0288522 A1 * 11/2009 Tseng ...................... B23P 15/00 29/592
2010/0116098 A1 * 5/2010 Kuo ...................... B25B 15/001 81/121.1
2014/0053692 A1 * 2/2014 Hu .......................... B25B 13/06 81/121.1
2016/0193724 A1 * 7/2016 Abel ..................... B25B 13/065 81/125
2021/0252675 A1 * 8/2021 Landa Fernandez De La Bastida ................... B25B 13/06

* cited by examiner

SOCKET

BACKGROUND OF THE INVENTION

1. Technical Field

The present disclosure relates to a socket and more particularly to a socket with a resistance structure.

2. Description of Related Art

Conventional sockets have a grip portion provided with a protruding or sunken pattern for increasing the friction between the grip portion and an operator's hand. If there is insufficient friction between the surface of a socket and the hand of an operator trying to remove the socket from a hand tool, the operator will have problem gripping the socket securely during the removing process. Therefore, how to increase the security with which a socket can be gripped while the socket is being operated is an issue to be solved by those working in the related fields.

In addition, it is not uncommon that a socket user turns a socket directly with their fingers, i.e., without using a hand tool, the objective being to turn the socket rapidly or pre-install a threaded fastener. If there is insufficient friction between the user's fingers and the socket surface, the user will be unable to operate the socket stably.

BRIEF SUMMARY OF THE INVENTION

The present disclosure provides a socket that has a resistance structure for increasing the friction between the socket and an operator's hand so that the socket can be operated stably.

An embodiment of the present disclosure provides a socket that includes a main body. The main body includes an output surface, an outer annular wall, and a resistance structure. The output surface is located at one end of the main body, surrounds an opening of the main body, and is perpendicular to a driving axis of the socket. The outer annular wall is connected with the output surface and includes an operating portion. The resistance structure is located on, and extends annularly along, the output surface. When an operator tries to remove the socket from a hand tool, the aforesaid structural features provide increased friction between the operator's hand and the output surface so that the socket can be securely gripped.

The foregoing socket may be so designed that the resistance structure has a radial, web-like, or multi-ring configuration, and that the resistance structure extends from the opening to the outer periphery of the output surface.

The foregoing socket may be so designed that an angle ranging from 10 degrees to 165 degrees is formed between the output surface and the outer annular wall.

Another embodiment of the present disclosure provides a socket that includes a main body, and the main body includes an output surface, an outer annular wall, and a resistance structure. The output surface is located at one end of the main body, surrounds an opening of the main body, and is perpendicular to a driving axis of the socket. The outer annular wall is connected with the output surface and includes an operating portion. The resistance structure is located on, and extends annularly along, the operating portion of the outer annular wall. When an operator tries to turn or grip the socket directly with their hand, the aforesaid structural features provide increased friction between the operator's hand and the operating portion so that the socket can be operated stably.

The foregoing socket may be so designed that the resistance structure has a radial, web-like, or multi-ring configuration.

The foregoing socket may be so designed that an angle ranging from 10 degrees to 165 degrees is formed between the output surface and the outer annular wall.

Yet another embodiment of the present disclosure provides a socket that includes a main body, and the main body includes an output surface, an outer annular wall, and two resistance structures. The output surface is located at one end of the main body, surrounds an opening of the main body, and is perpendicular to a driving axis of the socket. The outer annular wall is connected with the output surface and includes an operating portion. One of the resistance structures is located on, and extends annularly along, the output surface, and the other resistance structure is located on, and extends annularly along, the operating portion of the outer annular wall. The aforesaid structural features provide increased friction between the socket and an operator's hand so that the socket can be operated efficiently.

The foregoing socket may be so designed that the resistance structure provided on, and extending annularly along, the output surface has a radial, web-like, or multi-ring configuration and extends from the opening to the outer periphery of the output surface.

The foregoing socket may be so designed that the resistance structure on the operating portion of the outer annular wall has a radial, web-like, or multi-ring configuration.

The foregoing socket may be so designed that an angle ranging from 10 degrees to 165 degrees is formed between the output surface and the outer annular wall.

DETAILED DESCRIPTION OF THE INVENTION

Figure 1:
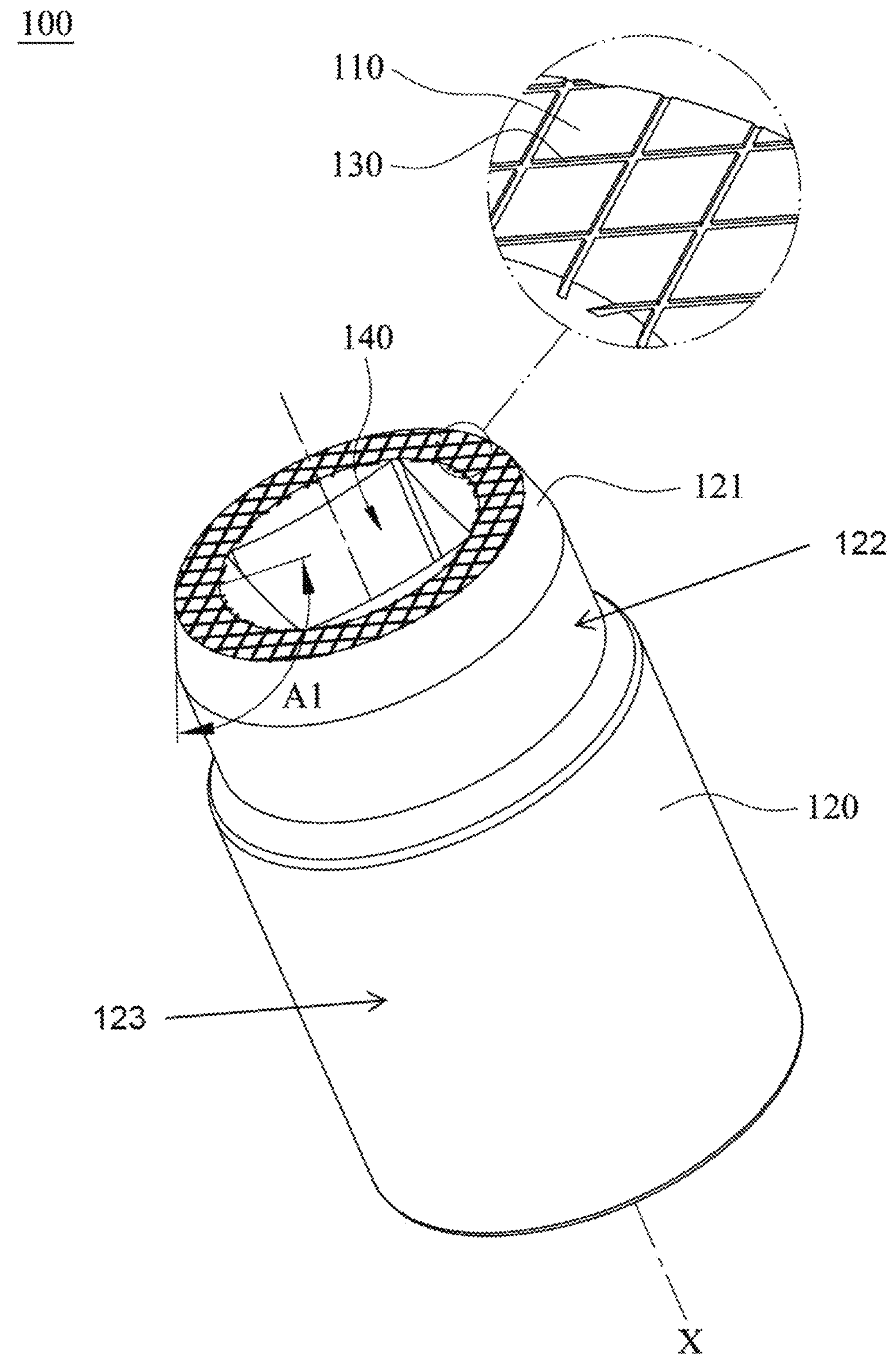
FIG. 1 is a perspective view of the socket according to an embodiment of the present disclosure.

Please refer to FIG. 1 for the socket 100 according to an embodiment of the present disclosure. As shown in FIG. 1, the socket 100 includes a main body. The main body includes an operating portion 121, a middle portion 122, and an engaging portion 123. The operating portion 121 has an output surface 110, the engaging portion 123 has an outer annular wall 120, and the output surface 110 has a resistance structure 130. The output surface 110 is located at one end of the main body, surrounds an opening 140 of the main body for engaging a hand tool, and is perpendicular to a driving axis X of the socket 100. The outer annular wall 120 is connected with the output surface 110 and includes an operating portion 121. The resistance structure 130 is provided on, and extends annularly along, the output surface 110 facing the hand tool when such is inserted into the socket 10.

Figure 2:
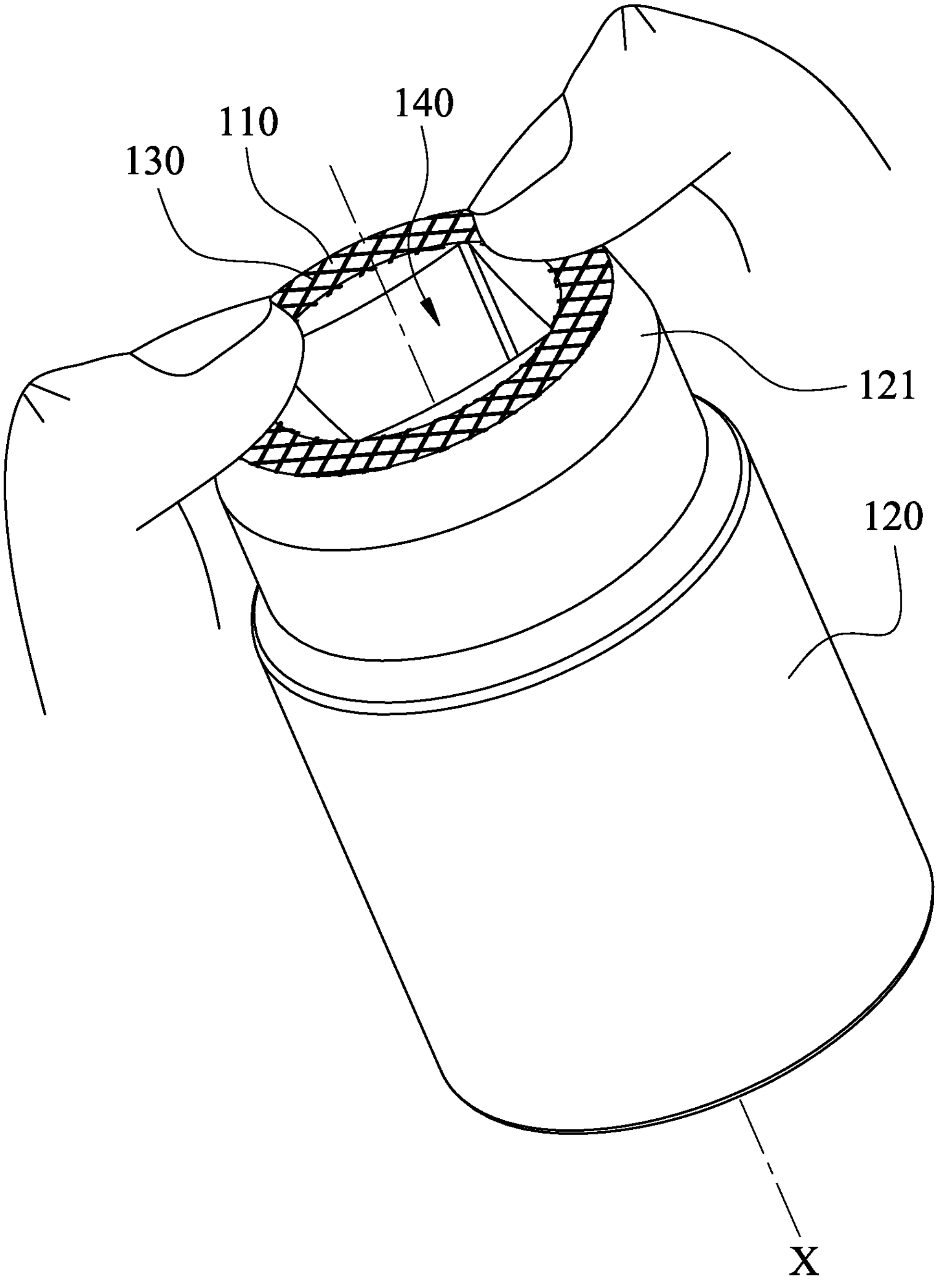
FIG. 2 is a perspective view showing how the socket in FIG. 1 can be operated.

The resistance structure 130 may have a radial, web-like, or multi-ring configuration. In the embodiment shown in FIG. 1, the resistance structure 130 has a web-like configuration. The present disclosure, however, has no limitation on the configuration of the resistance structure 130. The resistance structure 130 extends from the opening 140 to the outer periphery of the output surface 110. Please refer to FIG. 2, which shows how the socket 100 in FIG. 1 can be operated. It can be seen in FIG. 2 that when an operator tries to remove the socket 100 from a hand tool, the resistance structure 130, which extends to the outer periphery of the output surface 110, can provide increased friction between the operator's hand and the output surface 110, thereby allowing the socket 100 to be securely gripped, and preventing the socket 100 from sliding off the operator's hand. The pattern of the resistance structure 130 also helps the operator identify the mounting direction of the socket 100, so the socket 100 can be mounted efficiently in the dark.

The output surface 110 and the outer annular wall 120 form an angle A1. The angle A1 may range from 90 degree to 165 degrees. The present disclosure, however, has no limitation on the angle A1. The angle A1 serves to increase the efficiency with which the socket 100 can be mounted into a matching hand tool.

Figure 3:
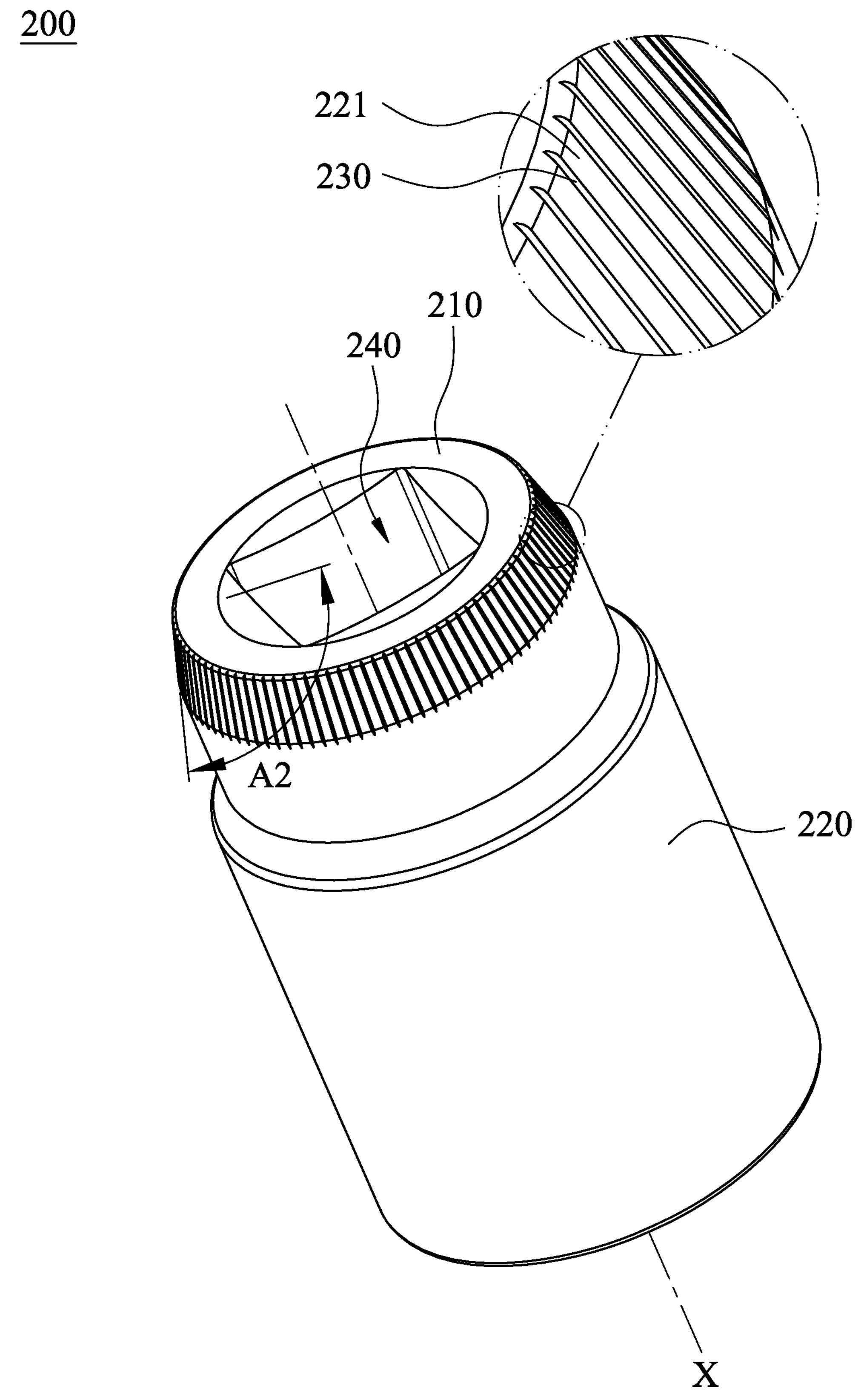
FIG. 3 is a perspective view of the socket according to another embodiment of the present disclosure.

Please refer to FIG. 3 for the socket 200 according to another embodiment of the present disclosure. As shown in FIG. 3, the socket 200 includes a main body, and the main body includes an output surface 210, an outer annular wall 220, and a resistance structure 230. The output surface 210 is located at one end of the main body, surrounds an opening 240 of the main body, and is perpendicular to a driving axis X of the socket 200. The outer annular wall 220 is connected with the output surface 210 and includes an operating portion 221. The resistance structure 230 is provided on, and extends annularly along, the operating portion 221 of the outer annular wall 220.

The resistance structure 230 may have a radial, web-like, or multi-ring configuration. In the embodiment shown in FIG. 3, the resistance structure 230 has a radial configuration. The present disclosure, however, has no limitation on the configuration of the resistance structure 230. When an operator is operating the socket 200 in a barehanded manner, the resistance structure 230 can provide increased friction between the operator's hand and the operating portion 221 so that the socket 200 will not slide off the operator's hand easily while being turned by the operator gripping the operating portion 221. This helps increase the efficiency with which the socket 200 can be operated. Moreover, the pattern of the resistance structure 230 facilitates the mounting of the socket 200 by making it easier for an operator to identify the orientation of the socket 200 in the dark.

The output surface 210 and the outer annular wall 220 form an angle A2. The angle A2 may range from 90 degrees to 165 degrees. The present disclosure, however, has no limitation on the angle A2. The angle A2 serves to increase the efficiency with which the socket 200 can be mounted into a matching hand tool.

Figure 4:
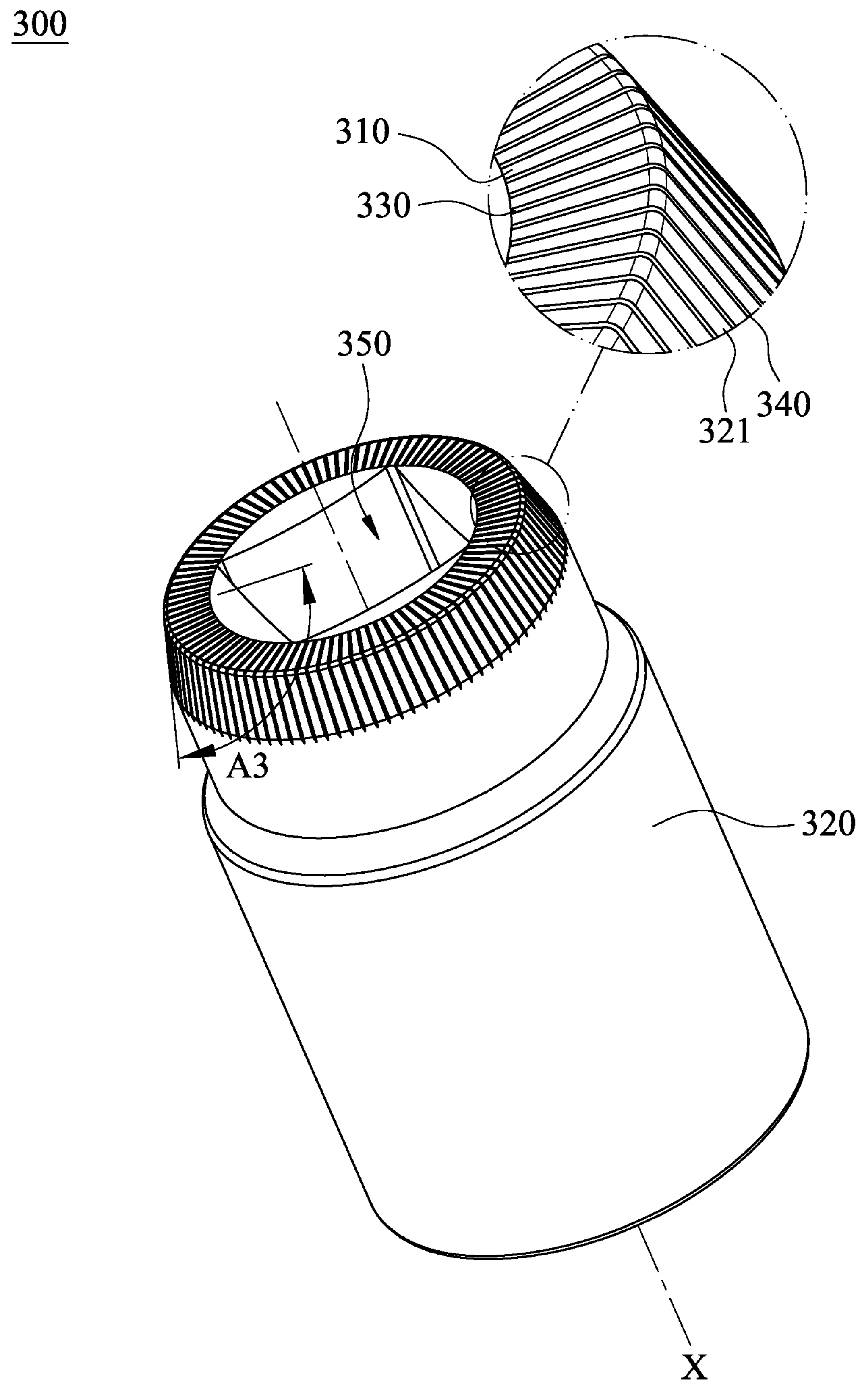
FIG. 4 is a perspective view of the socket according to yet another embodiment of the present disclosure.

Please refer to FIG. 4 for the socket 300 according to yet another embodiment of the present disclosure. As shown in FIG. 4, the socket 300 includes a main body, and the main body includes an output surface 310, an outer annular wall 320, and two resistance structures 330 and 340. The output surface 310 is located at one end of the main body, surrounds an opening 350 of the main body, and is perpendicular to a driving axis X of the socket 300. The outer annular wall 320 is connected with the output surface 310 and includes an operating portion 321. The resistance structure 330 is provided on, and extends annularly along, the output surface 310. The resistance structure 340 is provided on, and extends annularly along, the operating portion 321 of the outer annular wall 320.

The resistance structure 330, which is provided on, and extends annularly along, the output surface 310, may have a radial, web-like, or multi-ring configuration. In the embodiment shown in FIG. 4, the resistance structure 330 has a radial configuration. The present disclosure, however, has no limitation on the configuration of the resistance structure 330. The resistance structure 330 extends from the opening 350 to the outer periphery of the output surface 310. The resistance structure 330 on the output surface 310 is generally the same as the resistance structure 130 in the embodiment in FIG. 1 and therefore will not be described any further.

The resistance structure 340, which is provided on, and extends annularly along, the operating portion 321 of the outer annular wall 320, may have a radial, web-like, or multi-ring configuration. In the embodiment shown in FIG. 4, the resistance structure 340 has a radial configuration. The present disclosure, however, has no limitation on the configuration of the resistance structure 340. The resistance structure 340 on the operating portion 321 of the outer annular wall 320 is identical to the resistance structure 230 in the embodiment in FIG. 3 and therefore will not be described any further.

In the embodiment shown in FIG. 4, the resistance structure 340 and the resistance structure 330 correspond to each other; in other words, the resistance structures 330 and 340 can be viewed as extending from the output surface 310, or more particularly from the opening 350, to the operating portion 321. This design aims to simplify the manufacturing process, and thereby increase the production efficiency, of the socket 300.

The output surface 310 and the outer annular wall 320 form an angle A3. The angle A3 may range from 90 degrees to 165 degrees. The present disclosure, however, has no limitation on the angle A3.

FIG. 5 to FIG. 10 are schematic drawings of the sockets according to other embodiments of the present disclosure. Structures and features that are identical to their respective counterparts in the embodiments in FIG. 1 to FIG. 4 will not be described repeatedly. Only the distinguishing structures and features of the embodiments in FIG. 5 to FIG. 10 are detailed below.

Figure 5:
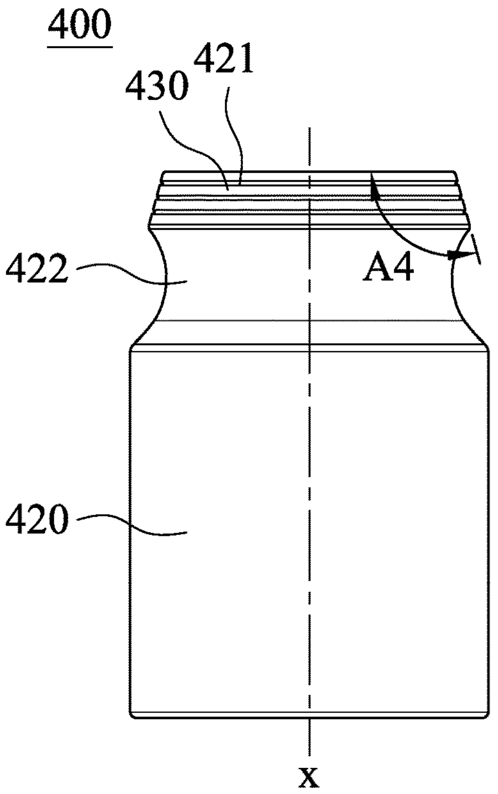
FIG. 5 schematically shows the socket according to still another embodiment of the present disclosure.

Please refer to FIG. 5 for the socket 400 according to an embodiment of the present disclosure. As shown in FIG. 5, the socket 400 includes a main body, and the main body includes an output surface (not shown), an outer annular wall 420, and a resistance structure 430. The output surface is located at one end of the main body, surrounds an opening (not shown) of the main body, and is perpendicular to a driving axis X of the socket 400. The outer annular wall 420 is connected with the output surface and includes an operating portion 421. The resistance structure 430 is provided on, and extends annularly along, the operating portion 421 of the outer annular wall 420.

In the embodiment shown in FIG. 5, the resistance structure 430 has a multi-ring configuration. The output surface and the operating portion 421 form an angle A4. The angle A4 may range from 90 degrees to 165 degrees such that the outer diameter of the operating portion 421 is gradually increased from the outer periphery of the output surface to the rear end of the operating portion 421 of the operating portion 421. The present disclosure, however, has no limitation on the angle A4. The outer annular wall 420 may further include a curved-surface structure 422, such that the curved-surface structure 422 has a concave surface around its periphery, so that when an operator tries to grip the front end of the socket 400 and operate the socket 400, the portion that is gripped can better conform to the contour of the operator's hand, thereby increasing the stability with which the socket 400 can be operated.

Figure 6:
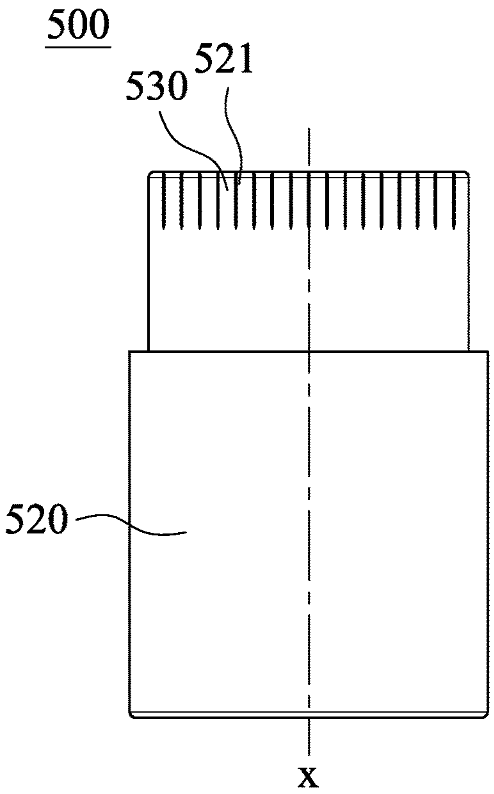
FIG. 6 schematically shows the socket according to yet another embodiment of the present disclosure.

Please refer to FIG. 6 for the socket 500 according to another embodiment of the present disclosure. As shown in FIG. 6, the socket 500 includes a main body, and the main body includes an output surface (not shown), an outer annular wall 520, and a resistance structure 530. The output surface is located at one end of the main body, surrounds an opening (not shown) of the main body, and is perpendicular to a driving axis X of the socket 500. The outer annular wall 520 is connected with the output surface and includes an operating portion 521. The resistance structure 530 is provided on, and extends annularly along, the operating portion 521 of the outer annular wall 520.

The outer diameter of the operating portion 521 is smaller than the outer diameter of the rest of the outer annular wall 520 such that the socket 500 has a step-like structure.

Figure 7:
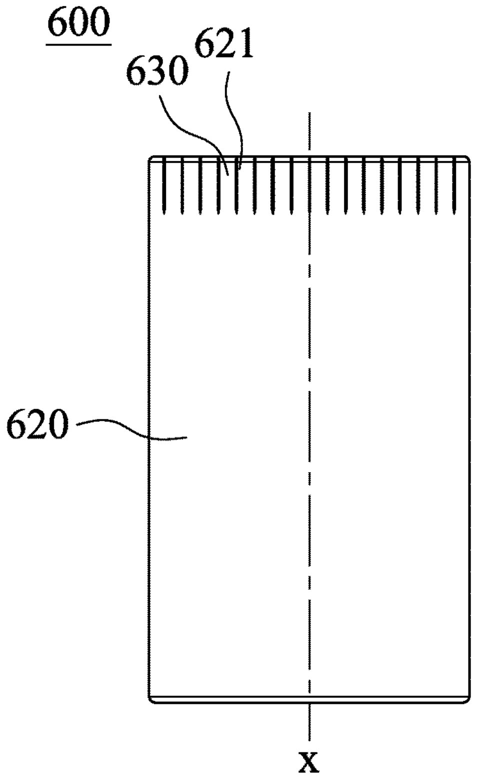
FIG. 7 schematically shows the socket according to still another embodiment of the present disclosure.

Please refer to FIG. 7 for the socket 600 according to yet another embodiment of the present disclosure. As shown in FIG. 7, the socket 600 includes a main body, and the main body includes an output surface (not shown), an outer annular wall 620, and a resistance structure 630. The output surface is located at one end of the main body, surrounds an opening (not shown) of the main body, and is perpendicular to a driving axis X of the socket 600. The outer annular wall 620 is connected with the output surface and includes an operating portion 621. The resistance structure 630 is provided on, and extends annularly along, the operating portion 621 of the outer annular wall 620.

The outer diameter of the operating portion 621 is the same as the outer diameter of the rest of the outer annular wall 620 such that the socket 600 forms a straight cylindrical structure.

Figure 8:
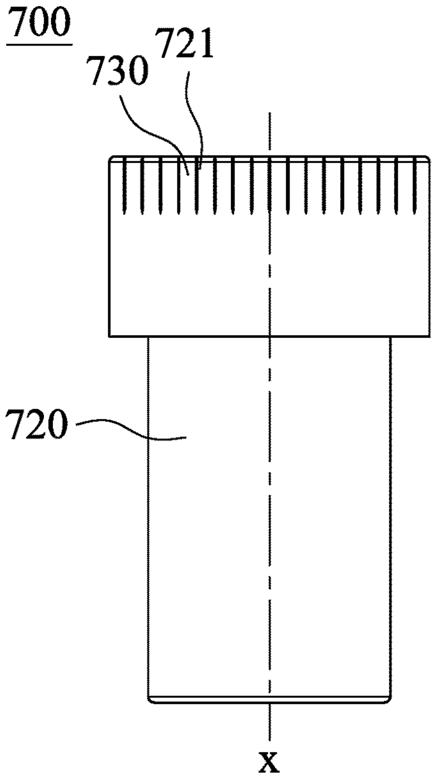
FIG. 8 schematically shows the socket according to yet another embodiment of the present disclosure.

Please refer to FIG. 8 for the socket 700 according to still another embodiment of the present disclosure. As shown in FIG. 8, the socket 700 includes a main body, and the main body includes an output surface (not shown), an outer annular wall 720, and a resistance structure 730. The output surface is located at one end of the main body, surrounds an opening (not shown) of the main body, and is perpendicular to a driving axis X of the socket 700. The outer annular wall 720 is connected with the output surface and includes an operating portion 721. The resistance structure 730 is provided on, and extends annularly along, the operating portion 721 of the outer annular wall 720.

The outer diameter of the operating portion 721 is greater than the outer diameter of the rest of the outer annular wall 720 such that the socket 700 has a step-like structure.

Figure 9:
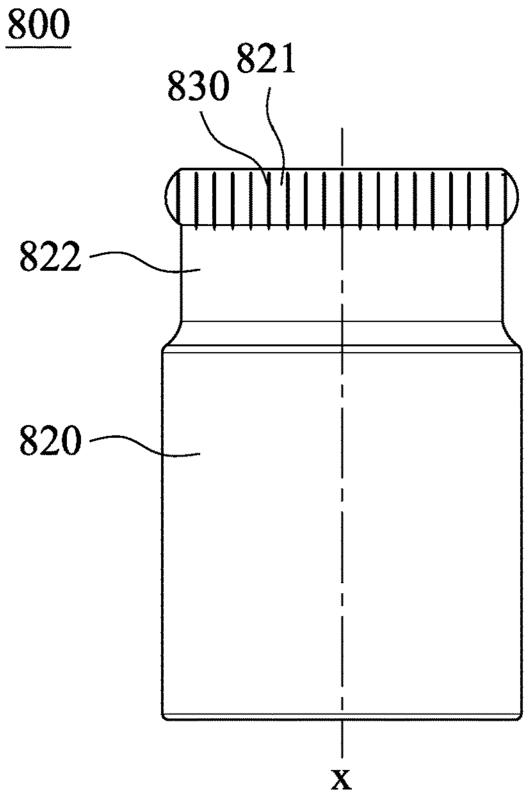
FIG. 9 schematically shows the socket according to still another embodiment of the present disclosure.

Please refer to FIG. 9 for the socket 800 according to yet another embodiment of the present disclosure. As shown in FIG. 9, the socket 800 includes a main body, and the main body includes an output surface (not shown), an outer annular wall 820, and a resistance structure 830. The output surface is located at one end of the main body, surrounds an opening (not shown) of the main body, and is perpendicular to a driving axis X of the socket 800. The outer annular wall 820 is connected with the output surface and includes an operating portion 821. The resistance structure 830 is provided on, and extends annularly along, the operating portion 821 of the outer annular wall 820.

As shown in FIG. 9, the operating portion 821 is a structure with a curved surface, a semi-circular profile, and the outer diameter of the operating portion 821 is gradually reduced from a middle portion toward the two ends of the operating portion 821. The smallest outer diameter of the operating portion 821 is equal to the outer diameter of a middle section 822 of the outer annular wall 820, and the outer diameter of the operating portion 821 is smaller than the greatest outer diameter of the rest of the outer annular wall 820.

Figure 10:
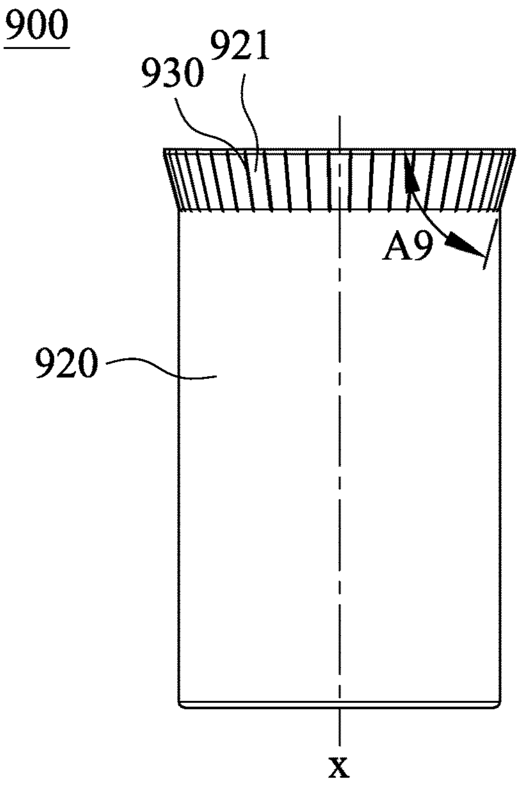
FIG. 10 schematically shows the socket according to yet another embodiment of the present disclosure.

Please refer to FIG. 10 for the socket 900 according to still another embodiment of the present disclosure. As shown in FIG. 10, the socket 900 includes a main body, and the main body includes an output surface (not shown), an outer annular wall 920, and a resistance structure 930. The output surface is located at one end of the main body, surrounds an opening (not shown) of the main body, and is perpendicular to a driving axis X of the socket 900. The outer annular wall 920 is connected with the output surface and includes an operating portion 921. The resistance structure 930 is provided on, and extends annularly along, the operating portion 921 of the outer annular wall 920.

The output surface and the operating portion 921 form an angle A9. The angle A9 may range from 10 degrees to 90 degrees such that the outer diameter of the operating portion 921 is gradually reduced from the outer periphery of the output surface to the rear end of the operating portion 921. The present disclosure, however, has no limitation on the angle A9.

While a number of embodiments of the present disclosure have been described above, those embodiments are not intended to be restrictive of the scope of the present disclosure. A person of ordinary skill in the art may change or modify the disclosed embodiments slightly without departing from the spirit or scope of the present disclosure. The scope of the patent protection sought by the applicant is defined by the appended claims.

What is claimed is:

1. A socket for engaging a hand tool, comprising:

an operating portion with an opening;

an output surface for insertion of the hand tool located on top of the operating portion, surrounding the opening, and the output surface being perpendicular to a driving axis of the socket;

a middle portion connected to the operating portion; and an engaging portion with an outer annular wall;

wherein a resistance structure is provided on, and extending annularly along, the output surface and the resistance structure faces the hand tool.

2. The socket of claim 1, wherein the resistance structure has a radial, web-like, or multi-ring configuration, and the resistance structure extends from the opening to an outer periphery of the output surface.

3. The socket of claim 1, wherein the output surface and the outer annular wall form an angle ranging from 10 degrees to 165 degrees.

4. The socket of claim 1, wherein the operating portion has a semi-circular profile.

5. The socket of claim 1, wherein the middle portion has a concave surface.

6. A socket for engaging a hand tool, comprising:

an operating portion with an opening;

an output surface for insertion of the hand tool located on top of the operating portion, surrounding the opening, and being perpendicular to a driving axis of the socket;

an outer annular wall connected with the output surface; and a resistance structure provided on, and extending annularly along, the operating portion of the outer annular wall, the resistance structure faces the hand tool.

7. The socket of claim 6, wherein the resistance structure has a radial, web-like, or multi-ring configuration.

8. The socket of claim 6, wherein the output surface and the outer annular wall form an angle ranging from 10 degrees to 165 degrees.

9. The socket of claim 6, wherein the operating portion has a semi-circular profile.

10. The socket of claim 6, further comprising a middle portion connected to the operating portion and the annual wall, wherein the middle portion has a concave surface.

11. A socket for engaging a hand tool, comprising:

an operating portion with an opening;

an output surface for insertion of the hand tool located on top of the operating portion, surrounding the opening, and being perpendicular to a driving axis of the socket;

an outer annular wall connected with the output surface; and two resistance structures, wherein one of the resistance structures is provided on, and extends annularly along, the output surface, and the other resistance structure is provided on, and extends annularly along, the operating portion of the outer annular wall.

12. The socket of claim 11, wherein the resistance structure provided on, and extending annularly along, the output surface has a radial, web-like, or multi-ring configuration and extends from the opening to an outer periphery of the output surface.

13. The socket of claim 11, wherein the resistance structure provided on, and extending annularly along, the operating portion of the outer annular wall has a radial, web-like, or multi-ring configuration.

14. The socket of claim 11, wherein the output surface and the outer annular wall form an angle ranging from 10 degrees to 165 degrees.

15. The socket of claim 11, wherein the operating portion has a semi-circular profile.

16. The socket of claim 11, further comprising a middle portion connected to the operating portion and the annual wall, wherein the middle portion has a concave surface.

* * * * *